(12) United States Patent
Berland et al.

(10) Patent No.: US 9,606,409 B2
(45) Date of Patent: Mar. 28, 2017

(54) ELECTROCHROMIC WINDOW INSERT ASSEMBLY AND METHODS OF MANUFACTURE

(71) Applicant: ITN Energy Systems, Inc., Littleton, CO (US)

(72) Inventors: Brian Spencer Berland, Morrison, CO (US); Michael Wayne Stowell, Jr., Loveland, CO (US)

(73) Assignee: ITN Energy Systems Inc., Littleton, CO (US)

( * ) Notice: Subject to any disclaimer, the term of this patent is extended or adjusted under 35 U.S.C. 154(b) by 33 days.

(21) Appl. No.: 14/486,522

(22) Filed: Sep. 15, 2014

(65) Prior Publication Data

US 2015/0077832 A1    Mar. 19, 2015

Related U.S. Application Data

(60) Provisional application No. 61/877,425, filed on Sep. 13, 2013.

(51) Int. Cl.
*G02F 1/153* (2006.01)
*G02F 1/15* (2006.01)
(Continued)

(52) U.S. Cl.
CPC ............... *G02F 1/153* (2013.01); *E06B 9/24* (2013.01); *G02F 1/161* (2013.01); *G02F 1/163* (2013.01);
(Continued)

(58) Field of Classification Search
CPC .......... G02F 1/15; G02F 1/153; G02F 1/1533; G02F 1/161; G02F 1/163; E06B 9/24;
(Continued)

(56) References Cited

U.S. PATENT DOCUMENTS

| 6,055,089 A | * | 4/2000 | Schulz | G02F 1/163 136/251 |
| 6,130,772 A | * | 10/2000 | Cava | G02F 1/163 359/265 |

(Continued)

FOREIGN PATENT DOCUMENTS

EP    2517332 A2    10/2012

OTHER PUBLICATIONS

Electric Power Research Institute, Development of Flexible Electrochromic Films, 1018525, Technical Update, Dec. 2009, EPRI Project Manager: K.R. Amarnath, 2009, 42 pgs.

(Continued)

*Primary Examiner* — Loha Ben
(74) *Attorney, Agent, or Firm* — George C. Lewis; Merchant & Gould P.C.

(57) ABSTRACT

An electrochromic insert adapted to be fitted into an existing window frame allowing an existing window to be retrofit to have the benefits of electrochromics. The insert may have a scaffold that fits into a window frame. Securing the insert to the frame may occur through a variety of ways including a bracket, a flexible tab, a brace, a screw, a bolt, a projection, a detent, and an adhesive. The technology allows for the electrochromic insert to include an electrochromic device, energy collection device, an energy storage device, and an electrochromic device controller. Such a configuration may be considered autonoumous such that it need not draw power from another source.

19 Claims, 12 Drawing Sheets

(51) Int. Cl.
*G02F 1/161* (2006.01)
*G02F 1/163* (2006.01)
*E06B 9/24* (2006.01)
*B60J 3/04* (2006.01)
*B32B 17/10* (2006.01)

(52) U.S. Cl.
CPC ........... *B32B 17/10055* (2013.01); *B60J 3/04* (2013.01); *E06B 2009/2464* (2013.01); *Y10T 29/49826* (2015.01)

(58) Field of Classification Search
CPC .... E06B 2009/2464; B60J 3/04; B32B 17/10; B32B 17/10055
USPC ..................................... 359/265–275; 29/428
See application file for complete search history.

(56) References Cited

U.S. PATENT DOCUMENTS

| | | | |
|---|---|---|---|
| 6,392,387 B1 | 5/2002 | Sage et al. | |
| 6,433,913 B1* | 8/2002 | Bauer | G02C 7/101 |
| | | | 156/107 |
| 6,515,787 B1 | 2/2003 | Westfall et al. | |
| 6,822,778 B2 | 11/2004 | Westfall et al. | |
| 6,856,444 B2 | 2/2005 | Ingalls et al. | |
| 7,009,750 B1 | 3/2006 | Westfall et al. | |
| 7,126,091 B1 | 10/2006 | Westfall et al. | |
| 7,133,181 B2 | 11/2006 | Greer | |
| 7,145,709 B1 | 12/2006 | Westfall et al. | |
| 7,215,457 B1 | 5/2007 | Westfall et al. | |
| 7,265,890 B1 | 9/2007 | Demiryont | |
| 7,265,891 B1 | 9/2007 | Demiryont | |
| 7,277,215 B2 | 10/2007 | Greer | |
| 7,372,610 B2 | 5/2008 | Burdis et al. | |
| 7,531,239 B2 | 5/2009 | Demiryont | |
| 7,586,667 B2 | 9/2009 | Demiryont | |
| 7,593,154 B2 | 9/2009 | Burdis et al. | |
| 7,619,804 B1 | 11/2009 | Demiryont | |
| 7,704,555 B2 | 4/2010 | Demiryont | |
| 7,830,585 B2 | 11/2010 | Widjaja et al. | |
| 7,990,603 B2* | 8/2011 | Ash | B60J 3/04 |
| | | | 359/265 |
| 8,164,818 B2* | 4/2012 | Collins | B32B 17/10055 |
| | | | 345/49 |
| 8,292,228 B2 | 10/2012 | Mitchell et al. | |
| 8,632,034 B2* | 1/2014 | Mitchell | B60J 3/04 |
| | | | 244/129.3 |
| 8,643,933 B2* | 2/2014 | Brown | H01R 41/00 |
| | | | 359/275 |
| 8,711,465 B2* | 4/2014 | Bhatnagar | B32B 17/10055 |
| | | | 359/275 |
| 8,976,440 B2* | 3/2015 | Berland | G02F 1/163 |
| | | | 244/129.3 |
| 2011/0148218 A1 | 6/2011 | Rozbicki | |
| 2013/0201546 A1 | 8/2013 | Berland et al. | |

OTHER PUBLICATIONS

Wikipedia, "Smart Glass", obtained online on Apr. 30, 2013 at: http://en.wikipedia.org/wiki/Smart_glass, 8 pgs.

* cited by examiner

ELECTROCHROMIC WINDOW INSERT ASSEMBLY AND METHODS OF MANUFACTURE

CROSS-REFERENCE TO RELATED APPLICATION

This application claims priority to and the benefit of U.S. Provisional Application Ser. No. 61/877,425, filed Sep. 13, 2013, the disclosure of which is hereby incorporated by reference herein in its entirety.

INTRODUCTION

Electrochromic devices may be used in a variety of applications where it is desired to control the opacity of an object. For example, an electrochromic device may be used in conjunction with a window to create a so-called "smart window." Some smart windows may be constructed by first depositing the electrochromic device on a flexible original superstrate. Additionally, the electrochromic device may then be oriented such that light traveling through the window pane passes through the electrochromic device. A voltage applied to the electrochromic device changes the opacity of the electrochromic device. Controlling this voltage results in controlling the amount of light that passes through the window.

Smart windows may be used for privacy purposes or for energy efficiency purposes. Energy efficiency may be realized by controlling the amount of light entering a building through the window. For example, when it is desired to heat a space, such as an office building, the smart window may be controlled to allow more light to pass through the window. This light may heat the interior space and reduce the amount of additional energy required to heat the space to a desired temperature. Alternatively, the smart window may be used to allow less light to pass through a window, thus keeping the space cool.

It is with respect to these and other considerations that embodiments have been made. Also, although relatively specific problems have been discussed, it should be understood that the embodiments should not be limited to solving the specific problems identified herein.

Electrochromic Window Insert Assembly and Methods of Manufacture

An electrochromic insert adapted to be fitted into an existing window frame allowing an existing window to be retrofit to have the benefits of electrochromics. The insert may have a scaffold that fits into a window frame. Securing the insert to the frame may occur through a variety of ways including a bracket, a flexible tab, a brace, a screw, a bolt, a projection, a detent, and an adhesive. The technology allows for the electrochromic insert to include an electrochromic device, energy collection device, an energy storage device, and an electrochromic device controller. Such a configuration may be considered autonoumous such that it need not draw power from another source.

In one aspect, the technology relates to a system including a rigid scaffolding adapted to be fixed to a pre-existing window. The system also includes an electrochromic device spanning the rigid scaffolding.

In an additional aspect, the technology relates to a system including a superstrate, an electrochomic device fixed to the superstrate, and a securement system connected to the superstrate for securing the superstrate to a window frame.

Additionally, one aspect of the technology relates to a method including affixing an electrochromic device to a superstrate to form a sheet comprising a plurality of edges and a plurality of outer corners joining adjacent edges of the plurality of edges. The method also includes removing each of the plurality of outer corners so as to form a plurality of inner corners. Additionally, the method includes folding each of the plurality of edges such that adjacent inner corners contact each other, so as to form a box structure.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

The same number represents the same element or same type of element in all drawings.

DETAILED DESCRIPTION

It should be noted that this application uses the terms "transparent," "translucent," "opaque," and "opacity." As used in this application, the word "transparent" describes the property of allowing substantially all light, or a large portion thereof, of a given electromagnetic range (e.g., the visible range or a portion thereof) to pass through the material. As such, it is possible that a material may be "transparent" with respect to a certain portion of the electromagnetic spectrum, but be opaque or translucent with respect to other portions of the electromagnetic spectrum. Additionally, a device may be considered transparent even if some small amount of light within the given electromagnetic range is scattered or reflected. As used, "transparent" is best understood as a relative term to distinguish a state of an electrochromic device from an "opaque" state in which less light passes through the device. Translucent describes the property of scattering light as the light passes through an object. Translucent and transparent are not exclusive terms; that is, it is possible for a material to be both highly translucent and highly transparent or, alternatively, highly translucent but not very transparent. Opacity describes the degree to which a material prevents light or a portion of the electromagnetic spectrum from passing through the material, such degree ranging from highly transparent to perfectly opaque. A material may have multiple opacity states and may change between these opacity states. Unless explicitly stated, these terms refer at least to the visible spectrum, although one of skill in the art will understand that the affected spectrum may be expanded or changed depending on the end goal (e.g., if the goal is to manage temperature in the interior space, then increasing the opacity of non-visible portions of the electromagnetic spectrum may be beneficial).

As discussed above, in an embodiment, an autonomous electrochromic assembly may include an electrochromic device, an energy collection device, an energy storage unit, and an electrochromic device controller. This autonomous electrochromic assembly may be used in conjunction with or incorporated into a window to control the amount of light passing through the window. Because the autonomous electrochromic assembly is autonomous in the sense that it receives its power from ambient light (i.e., it may be considered self-powered or passively powered), it may be easily retrofitted into existing construction without the need to provide wired or active wireless power to the window. Thus, by simply replacing traditional windows or exterior (or interior) panels with the windows described herein, a structure may be upgraded to allow active control of the light energy passing into the structure. Alternatively, the electrochromic assembly need not be autonomous, but may be powered and/or controlled from a central building location.

Figure 1:
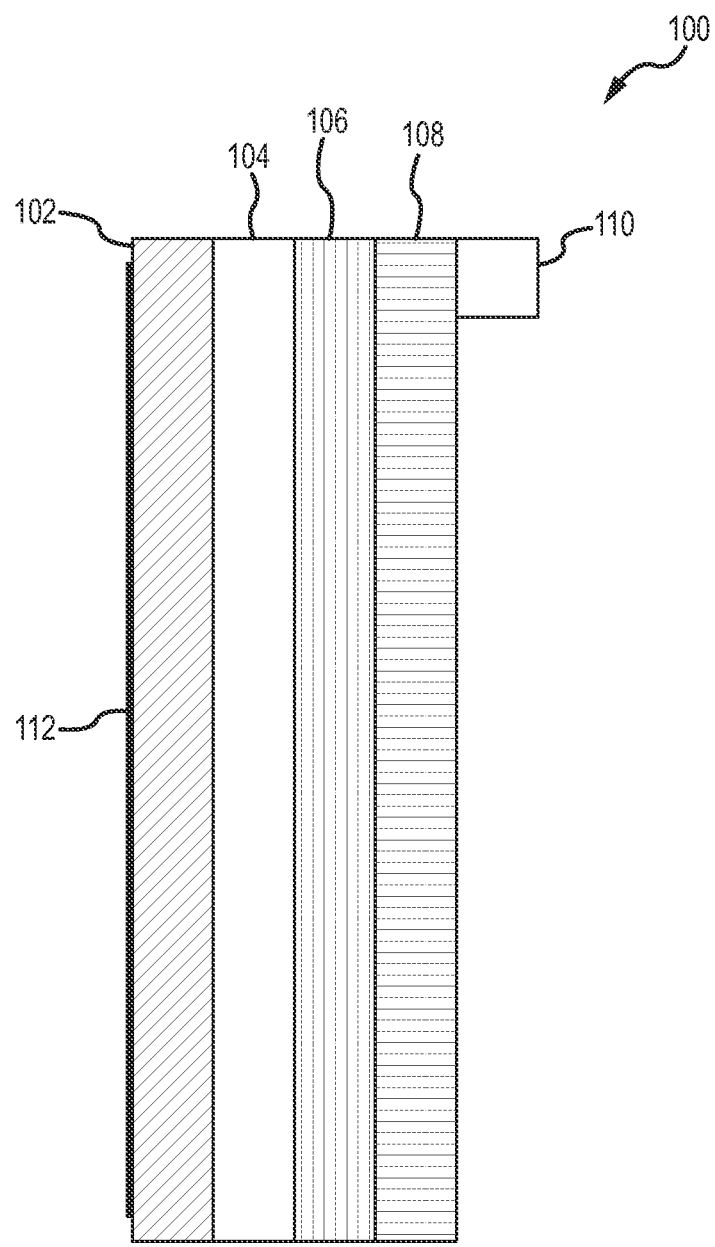
FIG. 1 depicts a side sectional view of one embodiment of an electrochromic assembly.

FIG. 1 depicts a side sectional view of one embodiment of an electrochromic assembly 100. In embodiments, an autonomous electrochromic assembly 100 includes an electrochromic device 102, a superstrate 104, an energy collection device 106, an energy storage device 108, and an electrochromic device controller 110.

In embodiments presented herein, the electrochromic device 102 is described as a thin film electrochromic device, although other types of electrochromic devices may be used. The electrochromic device 102 may have multiple layers including a substrate layer, a counter electrode layer, an electrolyte layer, and an electrochromic layer. The substrate layer may be flexible or rigid. The substrate layer may be indium tin oxide ("ITO") coated polyethylene terephthalate ("PET"). Alternatively, the substrate layer may be glass, or another substantially transparent or translucent material. Additionally, the counter electrode layer may be a lithiated metal oxide or a lithiated mixed metal oxide. For example, lithium vanadium oxide, lithium nickel oxide, and lithium nickel tungsten oxide (where the ratio of W to Ni is less than 1 to 1) may be used. The electrochromic layer may be a similarly mixed oxide, such as molybdenum tungsten oxide (where the Mo to W ratio is less than 1 to 1). These layers may be formed using a variety of processes such as physical vapor deposition, chemical vapor deposition, thermal evaporation, pulsed laser deposition, sputter deposition, and sol-gel processes. A roll-to-roll manufacturing process may be used for flexible electrochromic film. This process may achieve cost reduction with high-yield manufacturing, and is described in more detail herein.

A voltage may be applied to an electrochromic device 102 to cause the electrochromic device 102 to change its opacity state. For example, the electrochromic device 102 may change from substantially transparent with respect to the visible light range to an opacity state that reflects or otherwise prevents blue light from passing through the device. Other opacity changes are possible and may be selected by the manufacturer to achieve desired performance criteria. The electrochromic device 102 may become more or less reflective or opaque when voltage is applied.

Additionally, the electrochromic device 102 may be temperature controlled. A cooling device may be used to remove excess heat from the electrochromic device 102. Cooling the electrochromic device 102 may reduce heat transfer into a confined space, such as an interior of a building. Alternatively, heating the electrochromic device 102 may allow for a faster conversion of the electrochromic device 102 from one opacity state to another opacity state. The device used to control temperature may be a thermoelectric device that may provide either an active heating or cooling solution by reversing the polarity of the applied voltage. Depending on the embodiment, the power supplied to the thermoelectric device may be supplied by either or both of the energy collection device 106 or the energy storage device 108.

In rigid embodiments, the superstrate 104 may be a rigid plastic such as acrylic or PLEXIGLASS. The superstrate 104 may be affixed to the electrochromic device 102 by lamination or by any other suitable method. By adhering the material directly to the rigid superstrate 104 immediately after the manufacturing of the electrochromic device 102, wrinkling and creasing of the electrochromic device 102 may be mitigated. Alternatively the electrochromic device 102 may be mechanically attached to the superstrate 104. Additionally, direct deposition of the electrochromic device 102 onto the superstrate 104 may be utilized. This may also prevent wrinkling of the electrochromic device 102. The superstrate 104 may be substantially transparent with respect to the visible light range or translucent with respect to the visible light range.

The superstrate 104 may have additional integrated functionality. For example, resistive heaters may be used to heat the superstrate. This may be accomplished by running current through a slightly conductive superstrate. Electrical connections may be fed to a controller to control the power to a superstrate 104. This controller may be integrated within a device controller 110. Alternatively, the controller may be a separate controller. Heating a superstrate 104 may cause an electrochromic device 102 to be heated. This may reduce the time it takes an electrochromic device 102 to switch from one opacity state to another opacity state. This may occur because ion conductivities are poor at low temperatures, and heating the superstrate may heat an electrochromic device 102.

An energy collection device 106 may be used in the autonomous electrochromic assembly 100, and may be used to capture energy. The energy collection device 106 may be a thin film photovoltaic device or any other suitable construction. In embodiments, the energy collection device 106 may be a thin film photovoltaic and have a surface area such that the device need only collect a small portion of the light incident on the surface of the energy collection device 106. This may result in the energy collection device 106 being substantially transparent with respect to the visible light range. In an embodiment, the energy collection device 106 is substantially or entirely co-extensive with the electrochromic device 102 such that all or nearly all light passing through the assembly 100 passes through both the energy collection device 106 and the electrochromic device 102.

In other embodiments, the energy collection device 106 may be a wireless power beam devices (such as radio frequency, e.g., ZIGBEE or IR), a magnetic induction device, or a thermoelectric device. Any combination of energy collection devices may be used.

In alternative embodiments, the energy collection device 106 need not be substantially transparent, but may instead be substantially opaque. In one embodiment, the opaque energy collection device 106 may be integrated into an edge of the assembly 100, such as in the location of the window frame, or inside the window spacer. The energy collection device 106 may be oriented with respect to the window pane area such that it does not significantly reduce the line of sight. Thus, in this embodiment, the energy collection device 106 is not co-extensive with the electrochromic device 102.

The energy collection device 106 may be laminated or otherwise adhered to the superstrate 104. Alternatively, the energy collection device 106 may be deposited using similar or the same methods described with reference to depositing the electrochromic device 102. Deposition of the energy collection device 106 may occur concurrently with the electrochromic device 102 as part of a continuous manufacturing process.

The energy storage device 108 may be used in the electrochromic assembly 100. In embodiments, very thin metals and dielectrics may be used to form a thin film capacitor to store energy generated from the energy collection device 106. In embodiments, the capacitor may be a part of an infrared filter that rejects some infrared light or, alternatively, some other portion of the electromagnetic spectrum. This may reduce the need for other layers or coatings that perform similar infrared filter functions. In an embodiment, the energy storage device 108 may be substantially transparent with respect to the visible light range and may be substantially or entirely co-extensive with the electrochromic device 102 such that all or nearly all light passing through the assembly 100 passes through both the energy storage device 108 and the electrochromic device 102. In yet another embodiment, both the energy storage device 108 and the energy collection device 106 may be substantially transparent with respect to the visible light range and both may be substantially or entirely co-extensive with the electrochromic device 102 such that all or nearly all light passing through the assembly 100 passes through all three components of the assembly 100. Additionally, a capacitor or battery may be located at the edge of the window pane area outside of the sightline.

Alternatively, in an embodiment of the assembly 100, a battery could be employed as the energy storage device 108 to store energy. Such a battery could be a thin film lithium ion battery or similar construction. In an embodiment, the battery could be solid state or have a liquid or semiliquid electrolyte. The energy storage device 108 may be substantially transparent with respect to the visible light range. In an embodiment, the energy storage device 108 is substantially or entirely co-extensive with the electrochromic device 102 such that all or nearly all light passing through the assembly 100 passes through both the energy storage device 108 and the electrochromic device 102. Because the assembly 100 may be confined in a controlled and protected environment within a window or panel structure, some battery designs which would not be suitable for use under exposed conditions may be suitable in applications described herein. For example, the gas environment within the window volume (e.g., the selection of gas between the panes of the window) may be selected to allow the use of specific device designs that would not be suitable for use in an ambient environment.

The electrochromic device 102 may be controlled by the electrochromic device controller 110. In an embodiment, the electrochromic controller 110 may be a microchip controller. The electrochromic device controller 110 may be hidden from view, and may communicate wirelessly to a central control system or user interface using various communication protocols such as but not limited to BLUETOOTH, ZIGBEE, IR, and RF telemetry. Additionally, the electrochromic controller 110 may be integrated in the frame of the window. Power to the electrochromic device controller 110 may be supplied directly by the energy collection device 106, or it may be supplied by the energy storage device 108 which, in turn, may be supplied by the energy collection device 106. In an alternative embodiment, the electrochromic device controller 110 may be substantially transparent with respect to the visible light range. In an embodiment, the electrochromic device controller 110 is substantially or entirely co-extensive with the electrochromic device 102 such that all or nearly all light passing through the assembly 100 passes through both the electrochromic device controller 110 and the electrochromic device 102.

Although the autonomous electrochromic assembly 100 is illustrated as a series of layered, transparent thin film devices (which may be referred to as a unitary electrochromic insert assembly) with an attached electrochromic device controller 110, it need not be. In other embodiments, certain devices may be physically separated from the other devices of the assembly. For example, the electrochromic device 102 may be attached to a flexible superstrate 104. An electrochromic device 102 and a flexible superstrate 104 may then be attached to a transparent or translucent area of an object such as a window pane. An energy collection device 106 may be affixed to a different area that is exposed to a light source disposed outside of the window frame. The electrochromic device 102 may then be electrically coupled to the energy collection device 106. The energy storage device 108 may be electrically coupled to the energy collection device 106 and the electrochromic device 102. The electrochromic controller 110 may then be electrically coupled to the electrochromic device 102. The configuration may be such that the electrochromic device controller 110 controls the voltage and current delivered to the electrochromic device 102.

Additionally, although FIG. 1 illustrates the use of only one each of the electrochromic device 102, the superstrate 104, an energy collection device 106, the energy storage device 108, and the electrochromic device controller 110, multiple devices may be used in other embodiments.

The electrochomic assembly 100 can also include an adhesive layer 112 disposed on, for example the electrochromic device 102. By including the adhesive layer 112, which may be covered by a contact paper after manufacturing and during transit, the electrochromic assembly 100 can be applied to an existing window glass pane, either at a window manufacturer facility or at a site where an existing window is installed. Thus, the autonomous electrochromic assembly 100 can be utilized in retrofit installations so as to change functionality of a standard pane of glass.

Figure 2:
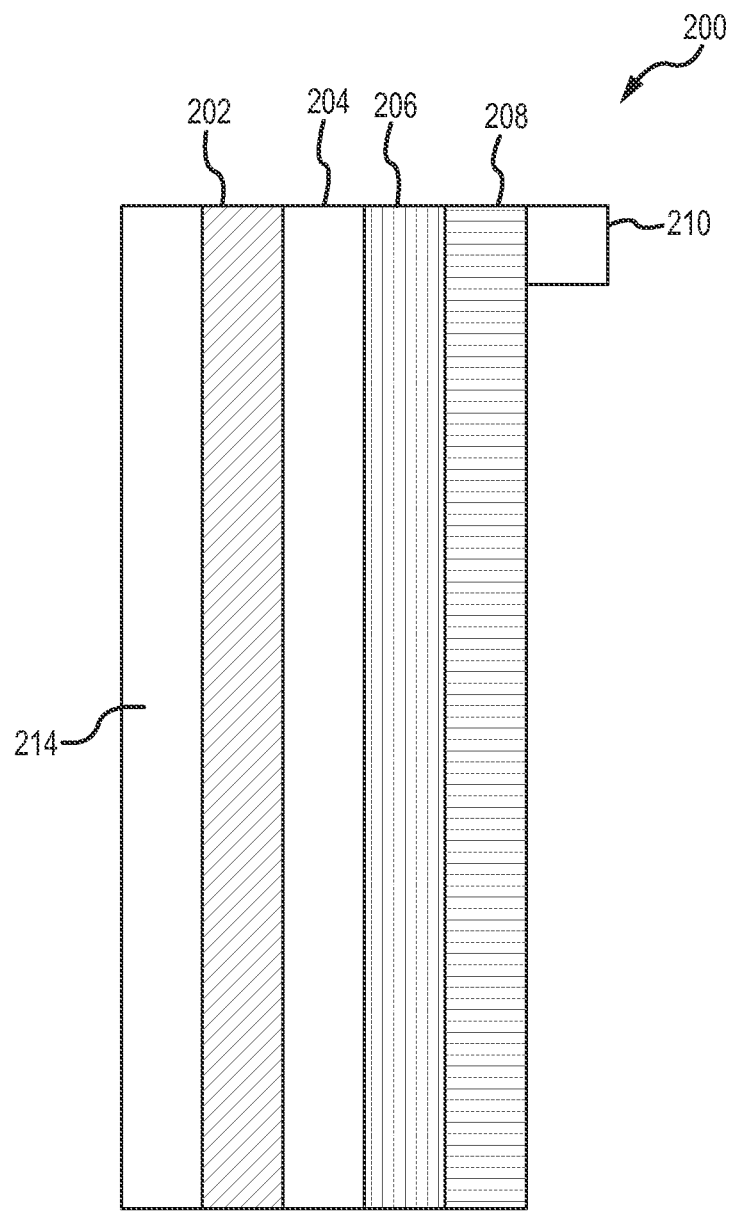
FIG. 2 depicts a side sectional view of another embodiment of an electrochromic assembly.

FIG. 2 depicts a side sectional view of another embodiment of an electrochromic assembly 200. Components common with the electrochromic assembly of FIG. 1 are numbered similarly and are generally not described further. In this embodiment, the electrochromic assembly 200 can be applied directly to a pane of window glass 214 during manufacture of a window. In such an embodiment, the superstrate 204 need not be utilized. However, utilization of the superstrate 204 may provide a robust base upon which to apply the energy collection device 206 and energy storage device 208.

Figure 3:
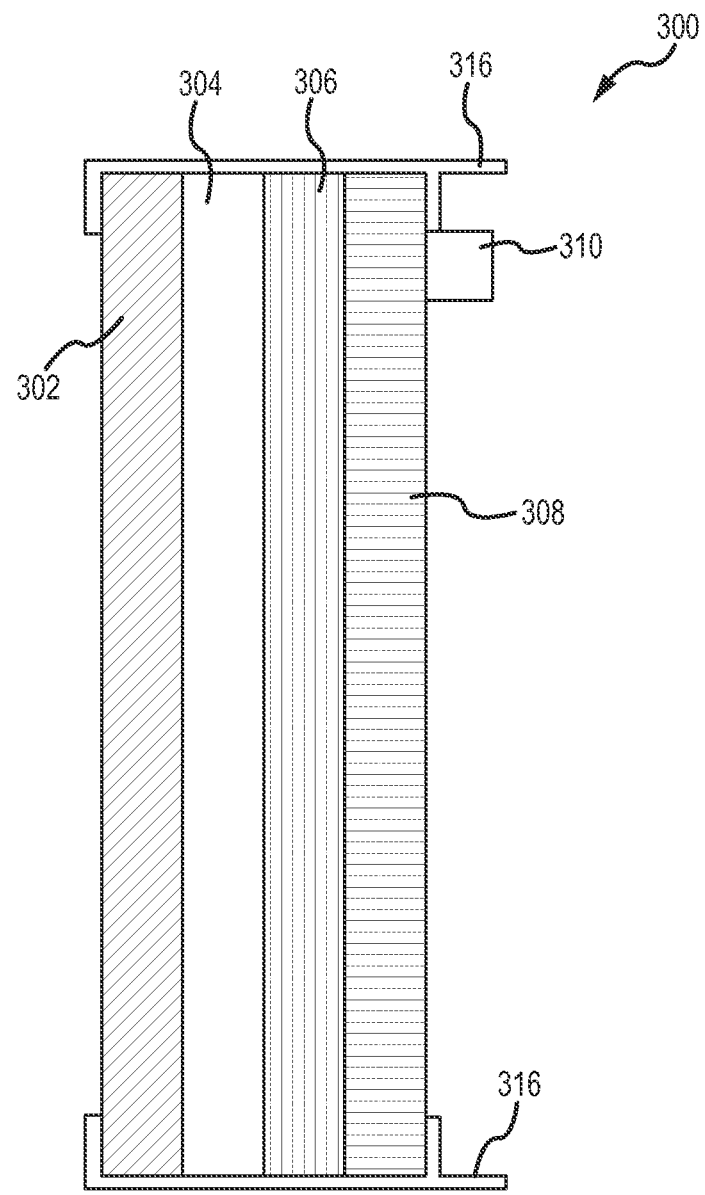
FIG. 3 depicts a side sectional view of another embodiment of an electrochromic assembly.

FIG. 3 depicts a side sectional view of another embodiment of an electrochromic assembly 300. Components common with the electrochromic assembly of FIG. 1 are numbered similarly and are generally not described further. In this embodiment, the electrochromic assembly 300 includes a rigid scaffolding system 316 between which the various layers of the electrochromic assembly 300 are stretched or spanned. The rigid scaffolding system 316 is generally disposed about two or more edges of the electrochromic assembly 300 and can be used to secure the electrochomic assembly 300 into an in situ window frame, without removal of the pane of glass of the window. Thus, the electrochromic system 300 is well-suited for retrofit applications without requiring removal of a window pane. The scaffold may be secured directly to the window frame, as described in more detail below. In certain embodiments, the controller 310 may be secured to the scaffolding system 316, which can conceal or integrate additional wiring, buses, electrical connections, etc.

Figure 4:
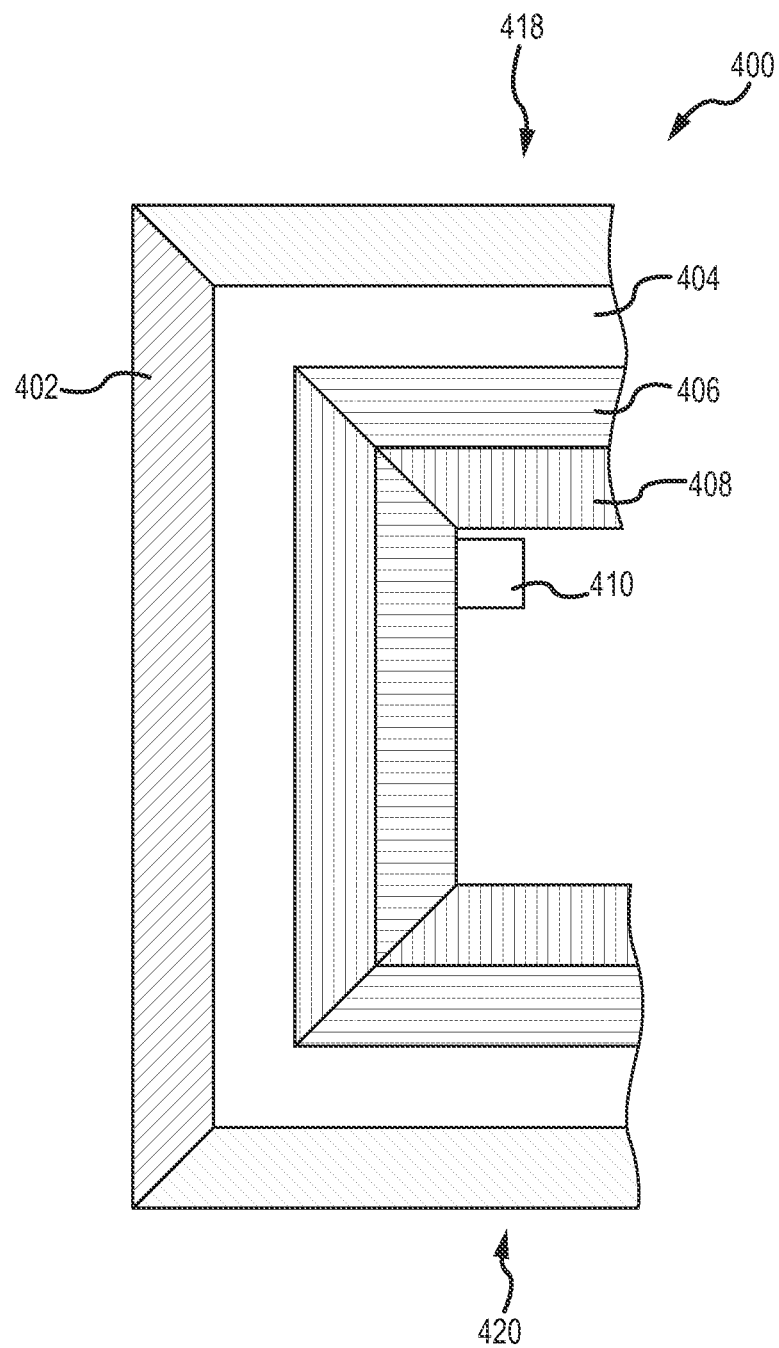
FIG. 4 depicts a side sectional view of another embodiment of an electrochromic assembly.

FIG. 4 depicts a side sectional view of another embodiment of an electrochromic assembly 400. Components common with the electrochromic assembly of FIG. 1 are numbered similarly and are generally not described further. In the depicted embodiment, after assembly of the electrochromic assembly 400, the finished assembly 400 can be folded to as to form a framed structure having at least a first leg 418 and a second leg 420. Indeed, similar to the embodiment of FIG. 3 that utilizes a scaffold, the first leg 418 and the second leg 420 can be used to secure the electrochromic assembly 400 into an existing window frame. Of course, all edges of the electrochromic assembly 400 can be folded to form a full-perimeter frame. In another embodiment, the frame may be formed of a discrete metal or plastic structure, and the edges of the electrochromic assembly 400 can be folded over the frame structure to provide additional rigidity at the edges.

Figure 5A:
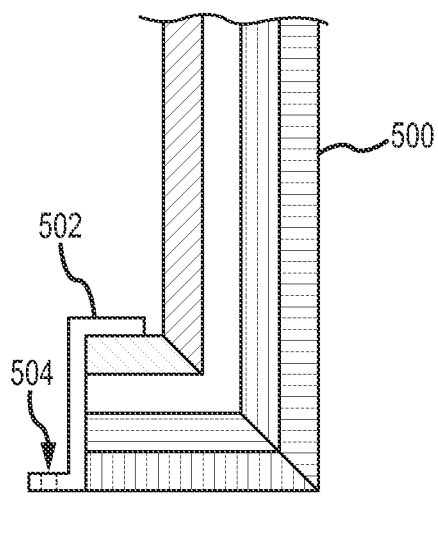
FIGS. 5A-5H depict views of embodiments of securement systems for an electrochromic assembly.
Figure 5B:
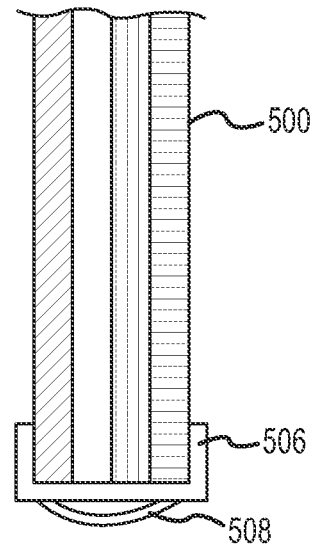
Figure 5C:
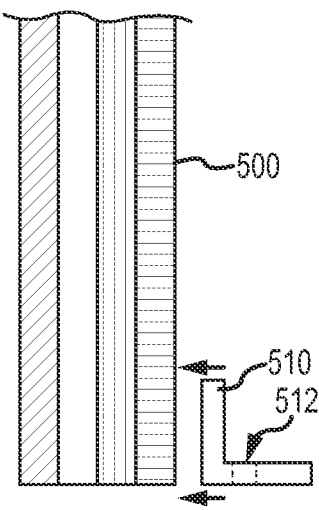
Figure 5D:
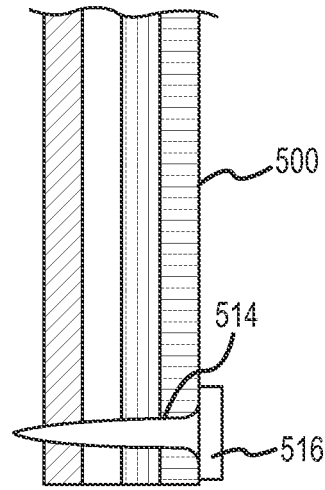

FIGS. 5A-5H depict views of embodiments of securement systems for an electrochromic assembly 500. In each figure, an electrochromic assembly 500 is depicted, which assembly may be the same as or similar to the embodiments of the electrochromic assembly depicted above in FIGS. 1-4. In FIG. 5A, the securement system is a bracket 502 secured to one or more edges of the electrochromic assembly 500 having a frame structure, as depicted in FIG. 4. The bracket 502 may define one or more openings 504 for receiving a screw, bolt, or other fastener. In FIG. 5B, the electrochromic assembly 500 includes a frame or U-shaped scaffolding 506 that protects the edges of the assembly 500. The frame 506 can include a flexible tab 508 that deflects during installation of the electrochromic assembly 500 into an existing window frame, so as to hold the assembly 500 in place. FIG. 5C depicts an electrochromic assembly 500 that may be held in place with a discrete brace 510. Once the assembly 500 is placed against a pane of glass in an existing window, the brace 510 may be placed in contact with the assembly 500 and secured in place with, e.g., a fastener installed through an opening 512 defined by the brace 510. FIG. 5D depicts an embodiment where the electrochromic assembly 500 is directly secured to a window frame via a screw installed through the assembly 500 itself. A cover plate 516 may cover the screw head for aesthetic or security purposes (e.g., to prevent tampering with the screws).

Figure 5E:
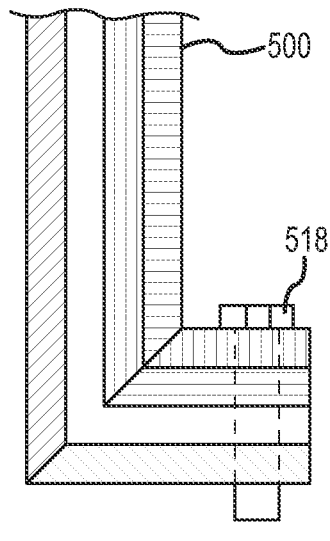
Figure 5F:
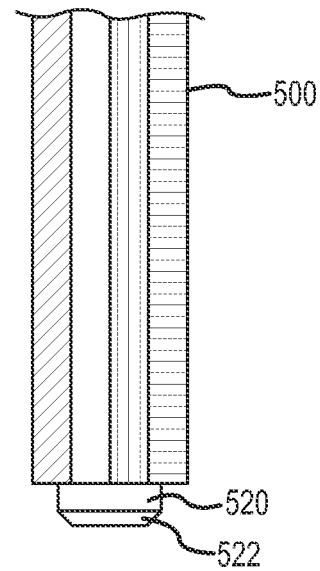
Figure 5G:
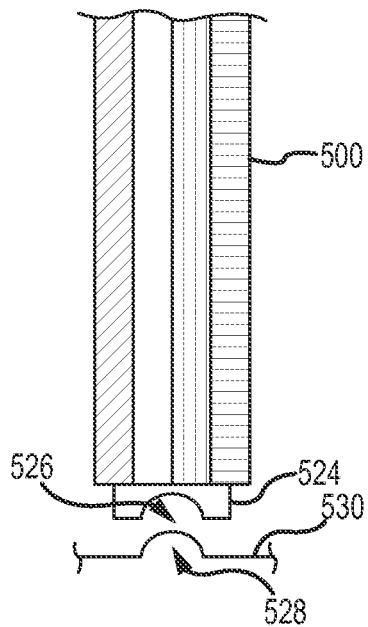
Figure 5H:
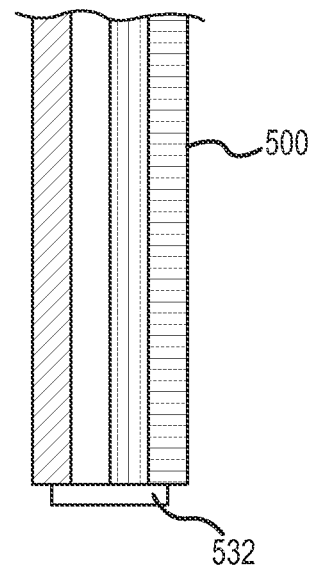

Another embodiment of a securement system is depicted in FIG. 5E. Here, an electrochromic assembly 500, such as the embodiment depicted in FIG. 4 defines an opening configured to receive a bolt 518 that may be secured directly to a window frame. FIG. 5F depicts a securement system in the form of a projection having a rigid base 520 secured about the outer perimeter of the electrochromic assembly 500. A resilient element 522 (e.g., a rubber or silicone strip) is secured to the rigid base 520 and helps secure, via friction-fit engagement, with a window frame. The securement system of FIG. 5G also includes a projection 524 that includes a detent 526 configured to mate with a matching projection 528 on a window frame 530. FIG. 5H depicts an electrochromic assembly 500 having an adhesive 532 disposed about the outer edge surface thereof. The adhesive 532 may be any factory- or field-applied adhesive that may be used to secure the assembly 500 to the window frame. Of course, other securement systems are contemplated. Additionally, various securement systems may be used with various configurations of electrochromic assembly (e.g., in the securement system depicted in FIG. 5E, a screw may be utilized instead of a bolt as depicted). Modifications to various securement systems will be apparent to a person of skill in the art.

Figure 6:
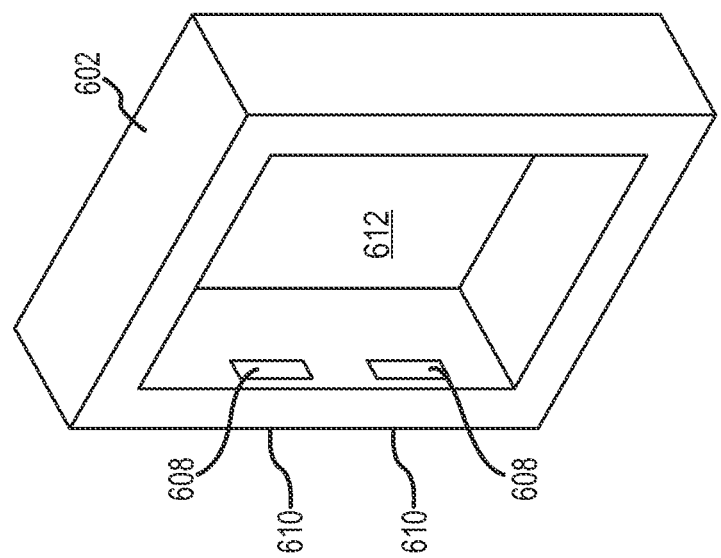
FIG. 6 depicts a method of installing a electrochromic insert into a window frame.
Figure 6:
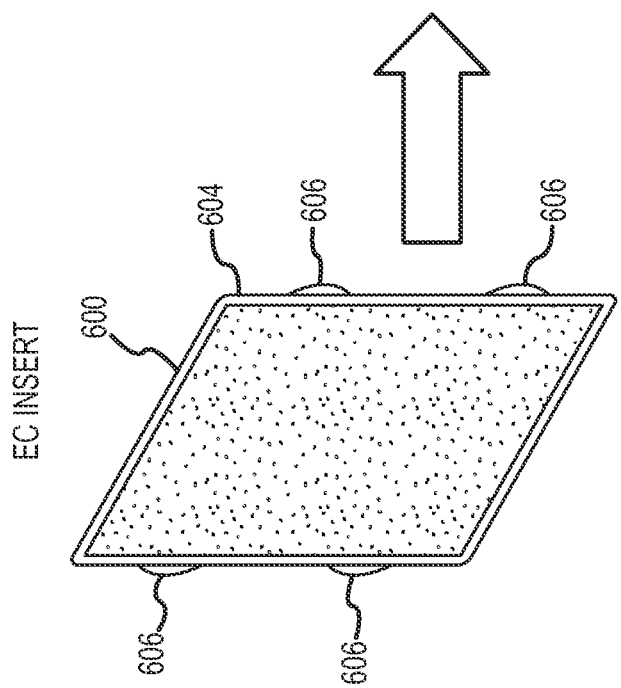

FIG. 6 depicts a method of installing an electrochromic assembly 600 into a window frame 602. The assembly 600 can include a frame 604 and flexible or resilient tabs 606, as described in the embodiment depicted in FIG. 5B. The tabs 606 are electrically conductive and may be aligned with corresponding contacts 608 on the outer frame structure 602. In this embodiment, the frame 604 is configured to protect the edges of the electrochromic assembly 600, while the outer frame structure 602 is configured to be secured to a building structure once installed. One or more of the contacts 608 in the outer frame structure 602 are connected to wiring 610 which can be used to power, control operation of, deliver power from, etc., the electrochromic assembly 600. Such functionality is described below. Once the electrochromic assembly 600 is installed in the outer frame structure 602, an interface between these two components may be sealed with silicone or rubber sealant.

In an embodiment, the outer frame structure houses a window pane 612. Accordingly, installation of electrochromic window assembly 600 may be done such that the U-Factor is improved. For example, the electrochromic insert window assembly 600 may form a gap between window pane 612 and the electrochromic window assembly 600. This gap may be filled with air and provide an additional layer of insulation that minimizes heat transfer.

Figure 7A:
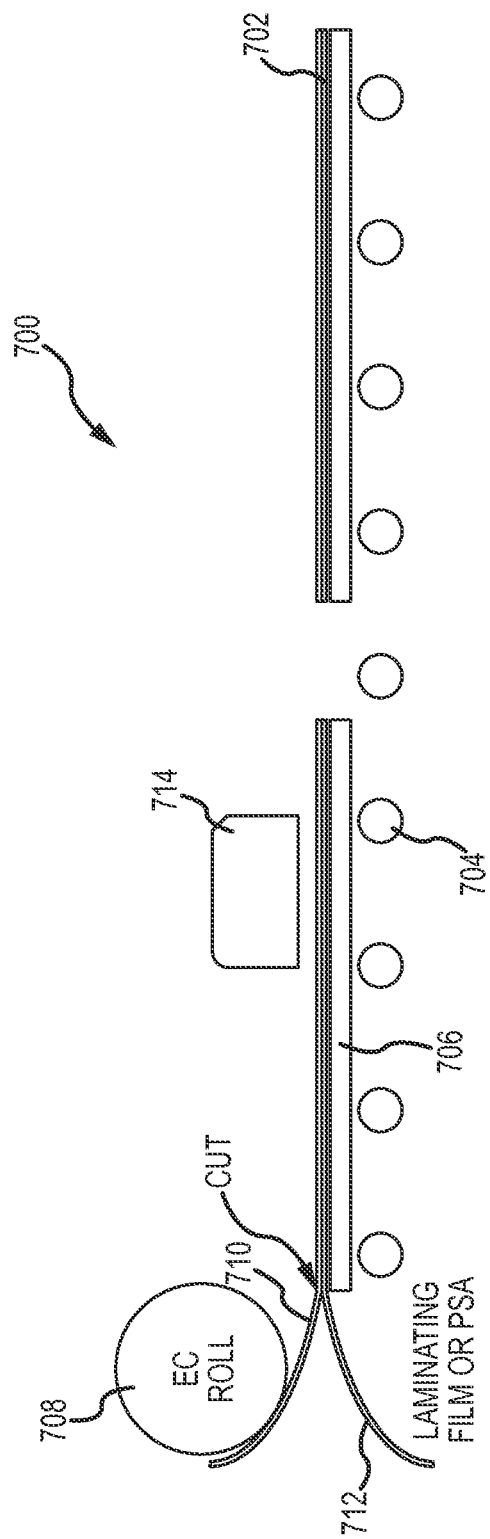
FIGS. 7A and 7B depict a system for manufacturing an electrochromic assembly.
Figure 7B:
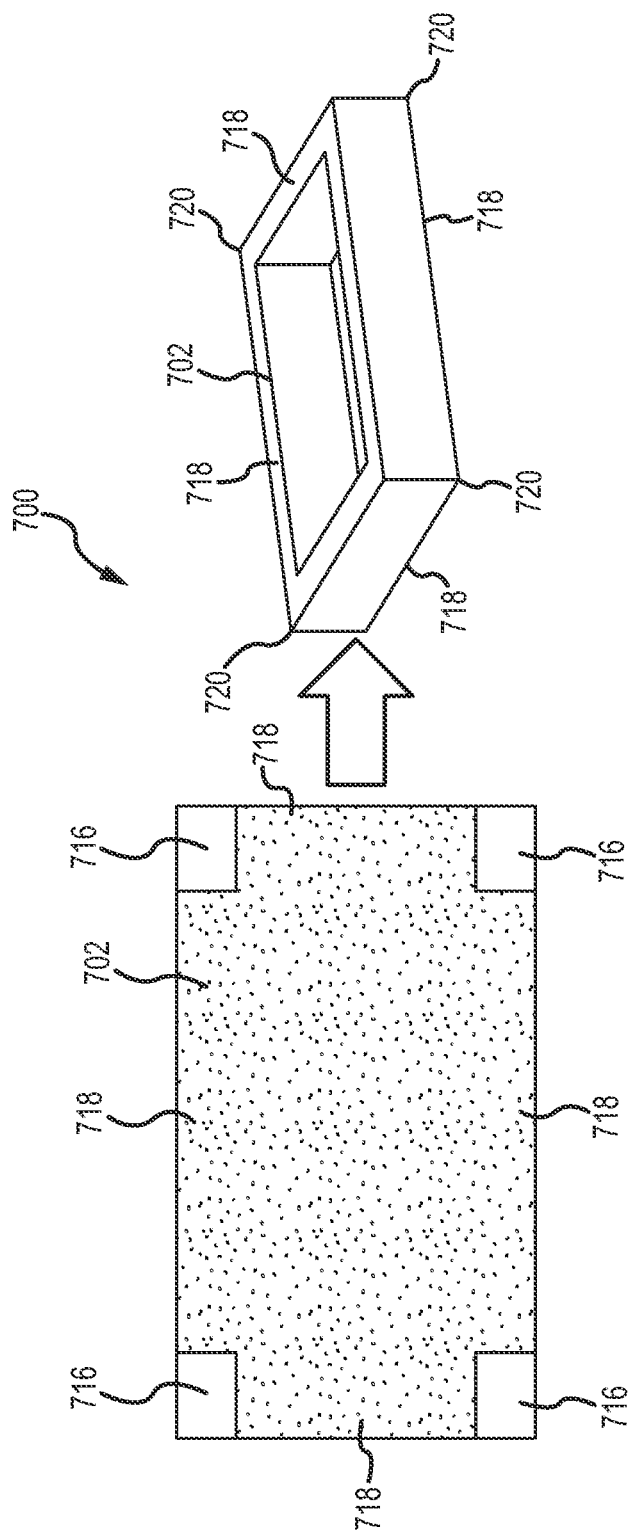

FIGS. 7A and 7B depict a partial view of a system 700 for manufacturing an electrochromic assembly 702. A conveyor 704 can be utilized to move the components from one station to another on the system 700, as required. Here, a rolled sheet 708 of a thin film electrochromic device 710 unrolls and is applied to a superstrate 706 with a laminating film, pressure-sensitive adhesive, or other adhesion element 712, which may also be unrolled or otherwise applied to the superstrate 706. Other film layers (energy collection devices, energy storage devices, and/or controller, as described above) may be similarly applied. After each film application, the applied film may be cut and the superstrate 706 may be passed through one or more curing stations 714. The curing stations 714 may apply pressure and heat to the assembly 702 so as to adhere each film to the superstrate 706, while avoiding bubbles, tears, or other manufacturing defects. The completed assembly 702 may then be finished by integrating control wiring or bus bars, correcting lithium loading, applying frame systems, etc. In another embodiment, the assembly 702 may be further processed as depicted in FIG. 7B, so as to form an electrochromic assembly 702 such as the type depicted in FIG. 4. Here, the system 700 cuts or removes corners 716 from the electrochromic assembly 702. Edges 718 of the assembly 702 are then folded so as to form the "box-like" configuration as depicted in FIG. 7B. Seams 720 at the intersection of each adjacent edge 718 may then be sealed so as to prevent water infiltration after installation. Other folds may be contemplated such as a "Z" fold or an "I" shaped fold.

Figure 8:
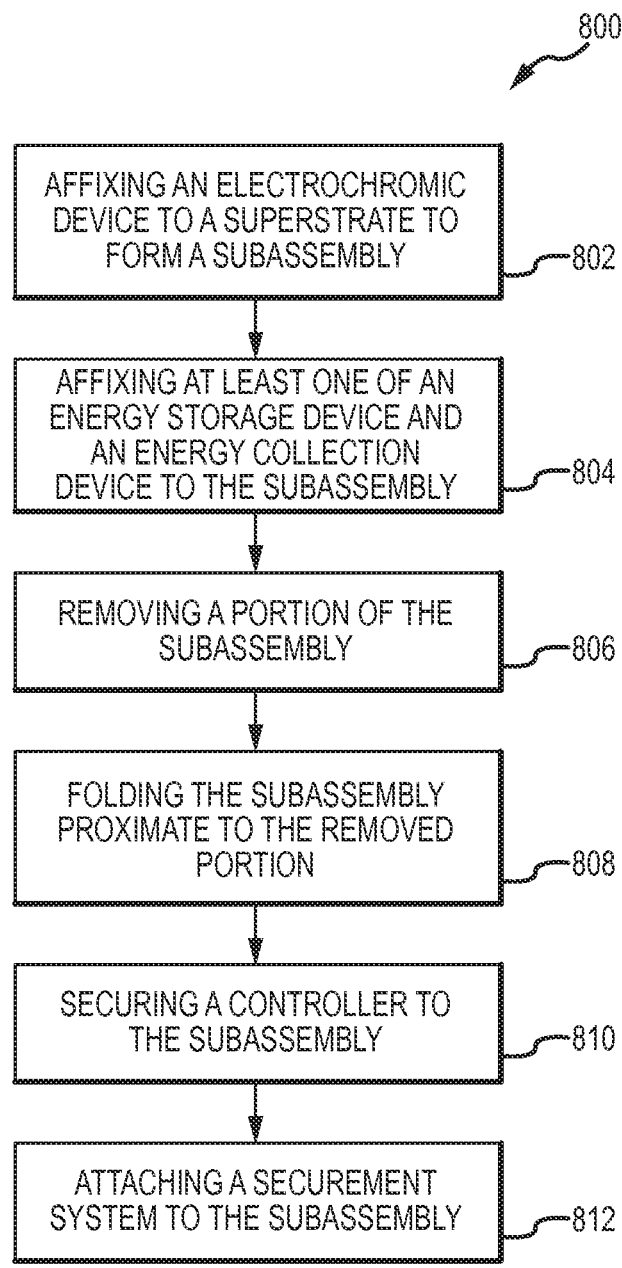
FIG. 8 depicts a method of manufacturing an electrochromic assembly utilizing the system of FIGS. 7A and 7B.

FIG. 8 depicts a method 800 of manufacturing an electrochromic assembly utilizing the system of FIGS. 7A and 7B. The method 800 begins by affixing an electrochromic device (e.g., in the form of a thin-film layer) to a superstrate so as to form a subassembly, operation 802. If desired, one or more of an energy storage device and an energy collection device can be affixed to the subassembly, operation 804. Once the required or desired elements are affixed, a portion of the subassembly may be removed if it is desired to produce the electrochromic assembly having the configuration depicted in FIG. 4, operation 806. Typically, the removed portions are disposed proximate corners of the assembly. The edges disposed proximate the corners may then be folded, operation 808. A controller, such as the type described herein can be attached to the subassembly, operation 810, along with any control or power wiring, buses, etc. Additionally, a securement system can be attached to the subassembly, operation 812.

Figure 9:
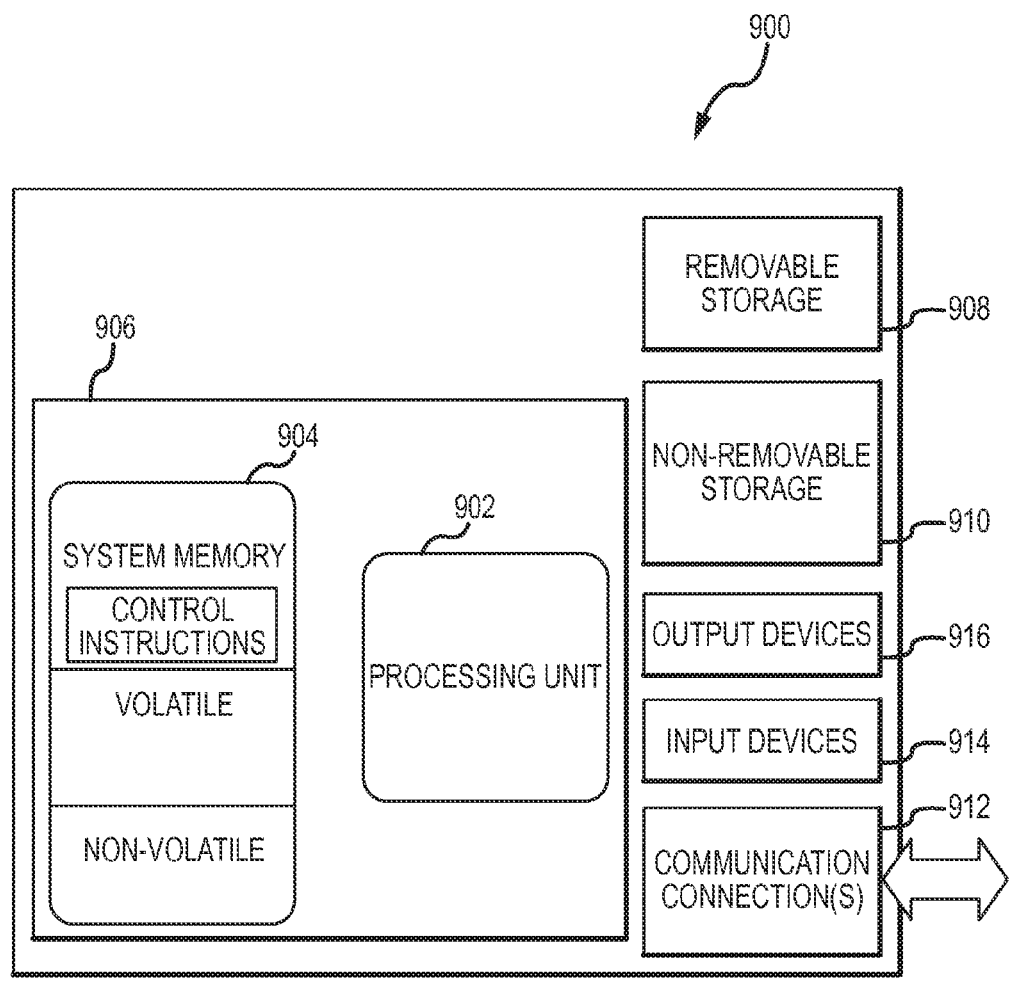
FIG. 9 depicts one example of a suitable operating environment in which one or more of the present examples may be implemented.

FIG. 9 illustrates one example of a suitable operating environment 900 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, smartphones, tablets, distributed computing environments that include any of the above systems or devices, and the like.

In its most basic configuration, operating environment 900 typically includes at least one processing unit 902 and memory 904. Depending on the exact configuration and type of computing device, memory 904 (storing, among other things, instructions to control an electrochromic device assembly) may be volatile (such as RAM), non-volatile (such as ROM, flash memory, etc.), or some combination of the two. This most basic configuration is illustrated in FIG. 9 by line 906. Further, environment 900 may also include storage devices (removable, 908, and/or non-removable, 910) including, but not limited to, magnetic or optical disks or tape. Similarly, environment 900 may also have input device(s) 914 such as touch screens, keyboard, mouse, pen, voice input, etc., and/or output device(s) 916 such as a display, speakers, printer, etc. Also included in the environment may be one or more communication connections, 912, such as LAN, WAN, point to point, Bluetooth, RF, etc.

Operating environment 900 typically includes at least some form of computer readable media. Computer readable media can be any available media that can be accessed by processing unit 902 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, solid state storage, or any other medium which can be used to store the desired information. Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The operating environment 900 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

In some embodiments, the components described herein comprise such modules or instructions executable by computer system 900 that may be stored on computer storage medium and other tangible mediums and transmitted in communication media. Computer storage media includes volatile and non-volatile, removable and non-removable media implemented in any method or technology for storage of information such as computer readable instructions, data structures, program modules, or other data. Combinations of any of the above should also be included within the scope of readable media. In some embodiments, computer system 900 is part of a network that stores data in remote storage media for use by the computer system 900.

Figure 10:
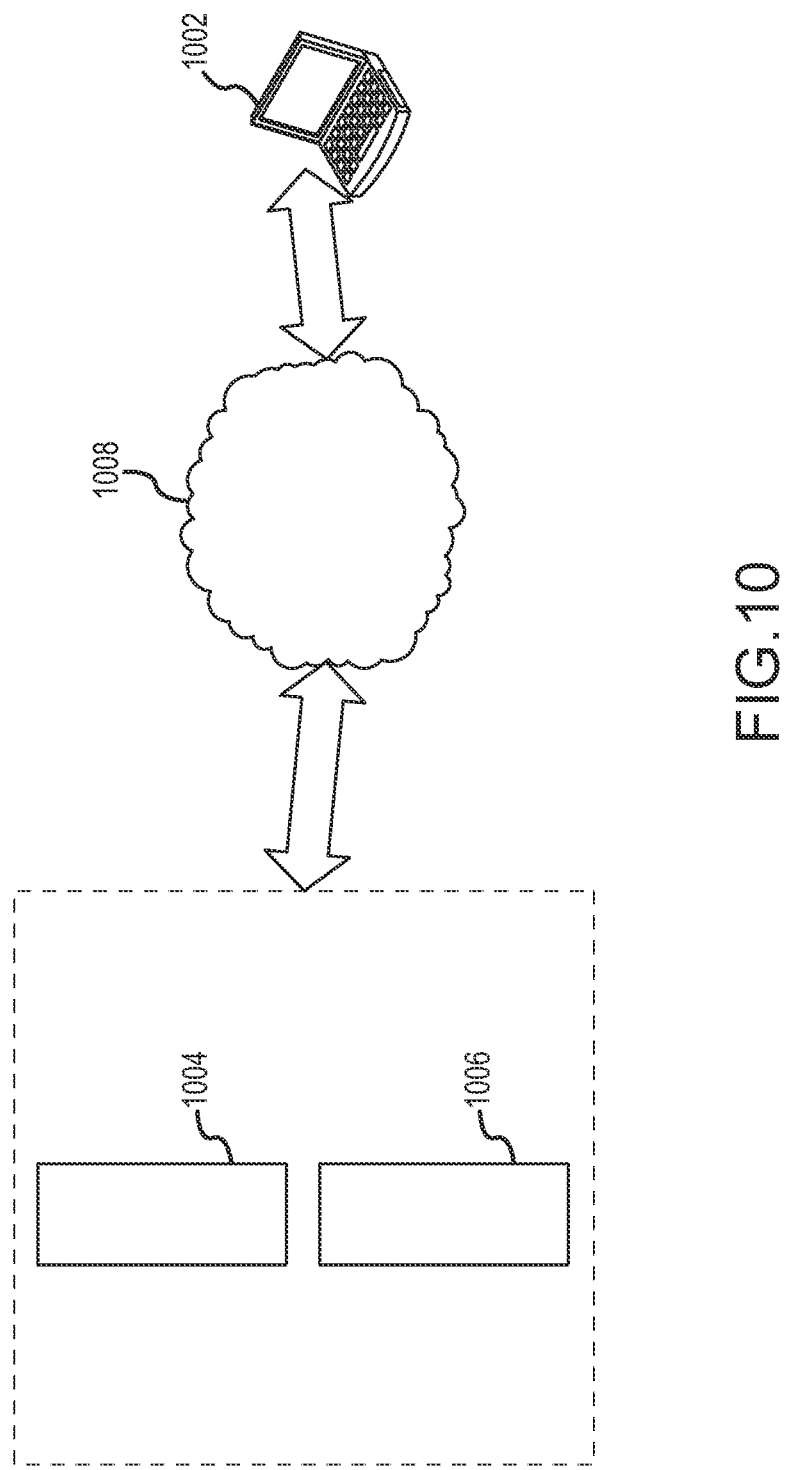
FIG. 10 is an embodiment of a network in which the various systems and methods disclosed herein may operate.

FIG. 10 is an embodiment of a network 1000 in which the various systems and methods disclosed herein may operate. In embodiments, portable device, such as client device 1002, may communicate with one or more electrochromic assemblies, such as electrochromic assemblies 1004 and 1006, via a network 1008. In embodiments, a client device may be a laptop, a tablet, a personal computer, a smart phone, a PDA, a netbook, or any other type of computing device, such as the computing device in FIG. 9.

The electrochromic assemblies 1004 and 1006 may have a device housing an operating environment depicted in FIG. 9. For example, a controller on an electrochromic assembly may be include the operating environment depicted in FIG. 9. The controller could then receive instructions from a client device, such as client device 1002 to control the opacity state of an electrochromic device. Additionally, the controller may receive instructions from a client device 1002 to decrease or increase the temperature of the assembly. This may occur when a superstrate is thermally controlled as described above.

Network 1008 may be any type of network capable of facilitating communications between the client device and one or more electrochromic assemblies 1004 and 1006. Examples of such networks include, but are not limited to, LANs, WANs, cellular networks, and/or the Internet.

Portable device 1002 may interact with electrochromic assembly 1004 via network 1008 to send and receive information, such as status checks and instructions to change opacity states.

The embodiments described herein may be employed using software, hardware, or a combination of software and hardware to implement and perform the systems and methods disclosed herein. Although specific devices have been recited throughout the disclosure as performing specific functions, one of skill in the art will appreciate that these devices are provided for illustrative purposes, and other devices may be employed to perform the functionality disclosed herein without departing from the scope of the disclosure.

This disclosure described some embodiments of the present technology with reference to the accompanying drawings, in which only some of the possible embodiments were shown. Other aspects may, however, be embodied in many different forms and should not be construed as limited to the embodiments set forth herein. Rather, these embodiments were provided so that this disclosure was thorough and complete and fully conveyed the scope of the possible embodiments to those skilled in the art.

Although specific embodiments were described herein, the scope of the technology is not limited to those specific embodiments. One skilled in the art will recognize other embodiments or improvements that are within the scope and spirit of the present technology. Therefore, the specific structure, acts, or media are disclosed only as illustrative embodiments. The scope of the technology is defined by the following claims and any equivalents therein.

What is claimed is:

1. A system comprising:
a rigid scaffolding adapted to be fixed to a pre-existing window;
an electrochromic device spanning the rigid scaffolding; and
an energy collection device spanning the rigid scaffolding.

2. The system of claim 1, further comprising a securement element for securing the rigid scaffolding to a window frame of the pre-existing window.

3. The system of claim 2, wherein the securement element is placed such that, when installed into the window frame of the pre-existing window, a gap is formed in between the electrochromic device and an existing window pane of the window frame.

4. The system of claim 2, wherein the securement element comprises at least one of a bracket, a flexible tab, a brace, a screw, a bolt, a projection, a detent, and an adhesive.

5. The system of claim 2, further comprising an electrical connection element, wherein the electrical connection element is integrated into the securement element.

6. The system of claim 1, further comprising a control module fixed to the rigid scaffolding, wherein the control module is configured to control operation of the electrochromic device.

7. The system of claim 6, further comprising at least one of an energy storage device and an electrical connection element secured to the rigid scaffolding.

8. The system of claim 7 where the energy storage device reflects at least a portion of the infrared spectrum.

9. A system comprising:
a superstrate;
an electrochomic device fixed to the superstrate;
a securement system connected to the superstrate for securing the superstrate to a window frame; wherein the securement system comprises a scaffolding secured to the superstrate and connected to a securement element; and
an energy storage device disposed on at least one of the electrochromic device or the securement system.

10. The system of claim 9, wherein the securement element comprises at least one of a bracket, a flexible tab, a brace, a screw, a bolt, a projection, a detent, and an adhesive.

11. The system of claim 10, wherein the securement element is a conductive bracket so as to enable communication between the electrochromic device and a communications module disposed remote from the electrochromic device.

12. The system of claim 9, further comprising a control module for controlling operation of the electrochromic device, wherein the control module is disposed on at least one of the electrochromic device and the securement system.

13. The system of claim 9, further comprising an energy collection device electronically connected to the energy storage device.

14. A method comprising:
affixing an electrochromic device to a superstrate to form a sheet comprising a plurality of edges and a plurality of outer corners joining adjacent edges of the plurality of edges;
removing each of the plurality of outer corners so as to form a plurality of inner corners; and
folding each of the plurality of edges such that adjacent inner corners contact each other, so as to form a box structure.

15. The method of claim 14, further comprising affixing at least one of an energy storage device and an energy collection device to the electrochromic device prior to the removing operation.

16. The method of claim 15, further comprising attaching a securement system to the box structure, wherein the securement system is adapted to secure the box structure to a window frame.

17. The method of claim 16, wherein the securement system comprises a securement element comprising at least one of a bracket, a flexible tab, a brace, a screw, a bolt, a projection, a detent, and an adhesive.

18. The method of claim 17, wherein the securement system further comprises a scaffolding secured to the box structure and connected to the securement element.

19. The method of claim 18, further comprising securing a controller to the box structure.

* * * * *